Figure 1:
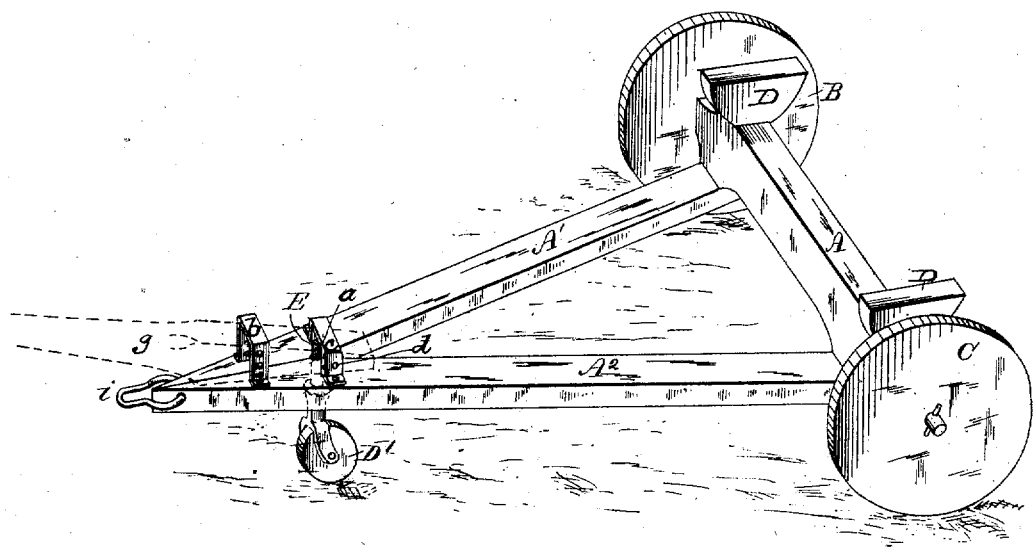

(No Model.)  2 Sheets—Sheet 1.

T. J. SCARFF.
TRUCK.

No. 253,948. Patented Feb. 21, 1882.

WITNESSES
C. E. Jones
Robt Brown

INVENTOR
Tullie J. Scarff
By Chas J. Gooch
Attorney (No Model.) 2 Sheets—Sheet 2.
T. J. SCARFF.
TRUCK.
No. 253,948. Patented Feb. 21, 1882.
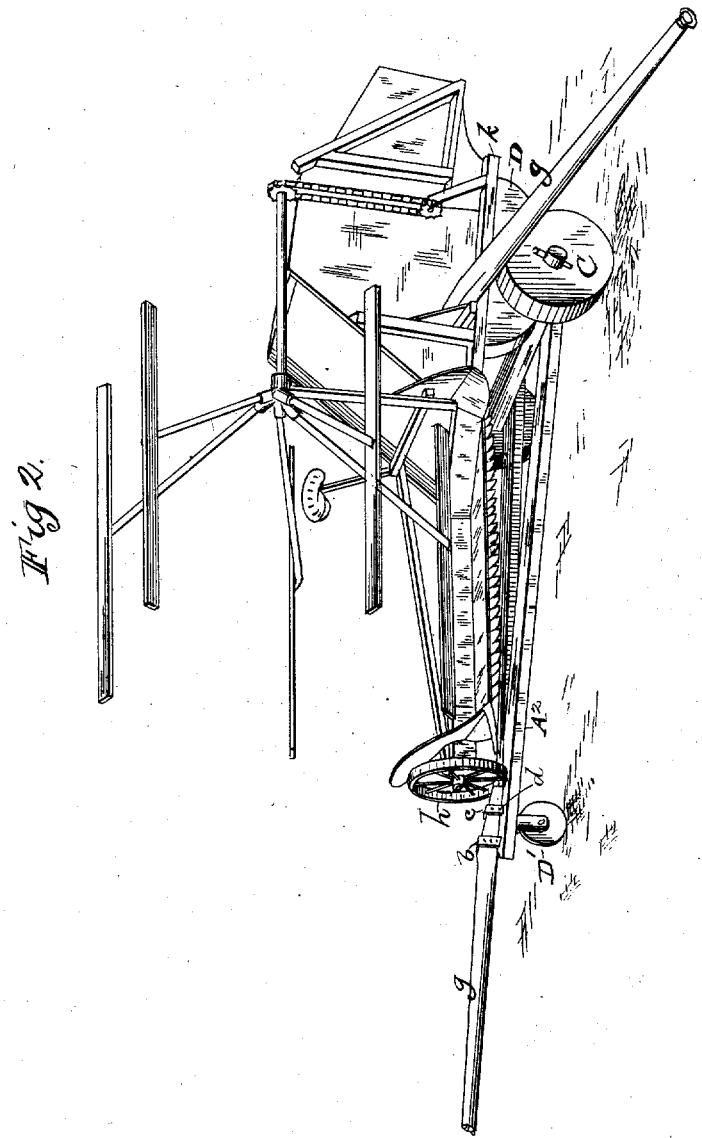

UNITED STATES PATENT OFFICE.

TULLIE J. SCARFF, OF NEW CARLISLE, OHIO.

TRUCK.

SPECIFICATION forming part of Letters Patent No. 253,948, dated February 21, 1882.

Application filed December 23, 1881. (No model.)

*To all whom it may concern:*

Be it known that I, TULLIE J. SCARFF, a citizen of the United States of America, residing at New Carlisle, in the county of Clarke and State of Ohio, have invented certain new and useful Improvements in Trucks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention consists in a truck, constructed as hereinafter described and claimed, for supporting and transporting self-binding harvesters from place to place and through gates and other ways narrower than the machines themselves.

In the drawings hereunto annexed, Figure 1 is a perspective view of my improved truck. Fig. 2 represents said truck with a harvester mounted thereon ready for transportation.

A A' A² represent the frame-work of the truck, which is preferably of triangular form, as shown. The rear beam, A, which constitutes the axle for the supporting and carrying wheels B C, is secured at each end to the top faces of the rear ends of the beams A' A², and is somewhat thicker than said beams.

To the top face of the axle A, near each end, is secured by pivotal connection or otherwise a bolster, D. These bolsters serve to support the sill or frame of the harvester when loaded upon the truck, as will be presently described.

D' represents a guide-wheel, which is pivotally secured by means of a spindle, E, to the forward portion of the truck-frame. This spindle E may be perforated at $a$, if desired, to adapt it and the wheel D', journaled thereto, to be raised or lowered to increase or diminish the height from the ground of the front end of the truck.

$b$ $c$ represent staples secured to the top of the beams A' A² at their forward ends. The rear staple, $c$, is shorter than the staple $b$, and receives the small end of the tongue $g$ of the harvester, as shown in dotted lines, Fig. 1, and in full lines, Fig. 2. This staple $c$ has a hole or holes, $d$, in its sides, through which and through the tongue therein are passed a bolt or bolts when it is desired to secure the tongue firmly in position while transporting the harvester. The forward staple, $b$, is somewhat larger than the staple $c$, in order to afford the tongue $g$ sufficient vertical movement therein.

$i$ represents a clevis, to which the team may be attached under some circumstances, as presently explained.

Considerable difficulty at present exists in transporting harvesters from one field to another field or place at some remote distance, owing to the gates as usually constructed being narrower than the harvester. The usual width of a harvester is fourteen feet. Farm-gates are seldom, if ever, more than ten feet wide. It has therefore been customary and necessary to tear down a portion of the fence to admit the harvester to a field in which it is to be operated. This is a very objectionable proceeding anyway, and when the fence is a barbed one, as is so often the case now-a-days, and especially so in the State from which I come, it will be seen that the objection to tearing down the fences possesses points of a very sharp character. Again, in transporting harvesters from place to place it is sometimes necessary to pass along roadways and over bridges of less width than the width of the harvester. It has therefore often been necessary to travel some distance out of the way in order to secure a sufficiently wide line of travel, and when it was desired to house the harvester it has often been found necessary to widen the doorway or other opening, as the case might be, before the machine could pass in. All of these objections to the general use of harvesters are overcome in a simple, inexpensive, and certain manner by the employment of my truck, as with it a harvester can be readily carried through or along any passage that a two-horse farm-wagon can pass through.

The manner in which a harvester is loaded or mounted upon the truck is as follows: The platform or cutter of the harvester is raised by means of the lever used to raise and lower the cutter. The truck is then backed under the platform until the axle A of the truck comes against the master-wheel of the harvester. This will bring the grain-wheel $h$ of the harvester over the guide-wheel of the truck, and resting upon the forward ends of the beams A' A², while the frame or sills k rest upon the bolsters, as shown in Fig. 2.

When it is desired to move the harvester from one field to another the team may be hitched to the clevis. When it is desired to move it some distance, and especially when hilly ground has to be traversed, the tongue g is removed from the harvester and passed through the staples b c, its inner end being secured within the staple c by a bolt or bolts passing through the holes d to and through similar holes in the inner end of the tongue. The tongue is loose within the forward staple, b, to admit of vertical play therein, which is necessary when passing over inequalities in the ground.

In Fig. 1 the application of the tongue is shown in dotted lines. In Fig. 2 a harvester is represented as mounted on the truck ready for transportation and for immediate use.

The operation of loading a harvester upon the truck is a very simple one, easily accomplished by one man in five minutes without the expenditure of much labor, as the lifting is greatly facilitated by the lever employed to raise the cutter.

The advantage secured to farmers by the use of the truck above described is great, as by means of it there will now be no difficulty whatever experienced in moving harvesters from place to place and through gates and other ways hitherto unadapted to receive them.

What I claim is—

The truck herein described, consisting of beams A A' A², wheels B C, bolsters D D, guide-wheel D', and staples b c, substantially as and for the purpose set forth.

In testimony whereof I affix my signature in presence of two witnesses.

TULLIE J. SCARFF.

Witnesses:
W. R. SLOAN,
M. K. GANTZ.